United States Patent

Yan et al.

[11] Patent Number: 5,816,987
[45] Date of Patent: Oct. 6, 1998

[54] ELLIPTIC TRAMMEL MECHANISM FOR AUTOMATIC TOOL CHANGING APPARATUS

[75] Inventors: Hong-Sen Yan; Wen-Miin Hwang; Fu-Chen Chen, all of Tainan; Han-Chuan Huang; Yan-Sheng Fan, both of Taichung, all of Taiwan

[73] Assignee: National Science Council, Taipei, Taiwan

[21] Appl. No.: 736,813

[22] Filed: Oct. 25, 1996

[51] Int. Cl.⁶ .................................................. B23Q 3/157
[52] U.S. Cl. .................................... 483/38; 483/30; 483/49
[58] Field of Search ................................. 483/44, 46, 49, 483/18, 30, 38, 39

[56] References Cited

U.S. PATENT DOCUMENTS

| | | | |
|---|---|---|---|
| 4,075,927 | 2/1978 | Frazier | 483/30 |
| 4,414,732 | 11/1983 | Tomita | 483/44 |
| 4,628,586 | 12/1986 | Yoshimi et al. | 483/30 |
| 4,833,772 | 5/1989 | Kobayashi et al. | 483/44 |

FOREIGN PATENT DOCUMENTS

| | | | |
|---|---|---|---|
| 62-4544 | 1/1987 | Japan | 483/44 |
| 63-52946 | 3/1988 | Japan | 483/39 |
| 1-115539 | 5/1989 | Japan . | |
| 5-288709 | 9/1993 | Japan . | |

*Primary Examiner*—A. L. Pitts
*Assistant Examiner*—Christopher Kirkman
*Attorney, Agent, or Firm*—Beveridge, DeGrandi, Weilacher & Young, L.L.P.

[57] ABSTRACT

An automatic tool changer in a machining center includes a reducer, a compound cam, a cylindric cam, a four-bar mechanism, an elliptic trammel mechanism, and a tool changer device. The compound cam and the cylindric cam are driven by a motor after speed reduction through a belt and gear train. The compound cam which is composed of a roller gear cam and a face cam performs the tool change motions. During the tool change motions, the cylindric cam drives the follower which is fixed on the slider of the elliptic trammel mechanism to make the other slider push the pull bar which produces the pushing and pulling tool motions in the spindle head. By way of using this design, the tool change time is largely reduced, the tool change motions are smoother, and the cost is less expensive than the previous designs.

8 Claims, 8 Drawing Sheets

5,816,987

ELLIPTIC TRAMMEL MECHANISM FOR AUTOMATIC TOOL CHANGING APPARATUS

FIELD OF INVENTION

This invention relates to an automatic tool changer in a machining center whereby in tool changing, the motion is smoother, the speed faster and the cost lower. Particularly, this invention relates to an automatic tool changer which proceeds a changing of the new and old tools on the tool magazine and the spindle to meet the different machining rquirements.

BACKGROUND

As shown in FIG. 1, 2 and 3, the existing design relates to an automatic tool changing apparatus of the machine tool. The motion of the tool changing arm is accomplished in a driven way by means of a roller gear cam 92a and a face cam 92b. During the motion of the tool changing arm, the sensing device 2a, 2b, 2c and 2d are applied to detect the position of the tool changing arm whereby the actuation and stop of the motor 51 and the motion of the oil compressing cylinder 121 are controlled for the drawbar 115 of the spindle to proceed the releasing or pulling of the tool in the spindle head, i.e. the so called tool pushing and tool pulling. Such a design is advantageous in that the construction is simple; the oil compressing cylinder may generate a great force to drive the drawbar to push and pull the tool; and the tool changing arm is allowed to continue with the next motion after the detection of the sensing device. As a result, a situation where the tool changing arm attempts to extract the tool when the drawbar of the spindle has not yet released the tool will not occur. However, this design is still not ideal. It has the defects that in the process of the tool changing, the sensing device has to at first detect the position of the tool changing arm and if the motion for tool pushing and tool pulling have been completed, then the motion of the motor is renewed. The possible looseness of the parts of the sensing device will fail to send a correct signal, as a result of which the tool changing mechanism will not operate normally and the greater torque required for starting the motor will render the motion not smooth, elongate excessively the tool changing time, i.e., increase the required time not cutting, and the productivity of the total machine tool will be lowered. Furthermore, the drawbar of the spindle could not be driven by the motor and requires a separately provided and independent oil compressing unit. It occupies a lot of space and renders the cost higher. Thus, the features of small volume, low cost and a quick tool changing motion provided in the present automatic tool changing mechanism of the machine tool has not yet been satisfied.

SUMMARY OF THE INVENTION

The conventional tool changing process is not ideal: the motor has to be started again during tool changing, the torque for starting the motor is greater, the motion is not smooth, the time for changing tool is too long, the productivity of the whole machining is lowered, and the drawbar of the spindle is not driven by the motor and instead an independent oil compressing unit must be separately provided. One object of this invention is to provide an automatic tool changing apparatus of the machine tool which changes the new and old tools in the tool magazine and the spindle head to meet different machining requirements.

The other object of this invention is to apply a compound cam to drive the spline and spline shaft to control the tool changing arm when changing a tool, and a cylindrical cam to drive a elliptic trammel mechanism whereby during tool changing, the motion of pushing and pulling the tool is smoother, the speed of tool changing quicker and the cost lower. Furthermore the defect that the looseness of the sensing devices fails to correctly detect and causes the automatic tool changing mechanism not able to operate normally is obviated.

To accomplish the above objects, an automatic tool changing mechanism according to this invention is mainly characterized in comprising a tool changing device, a compound cam, a four-bar mechanism, a cylindrical cam, a elliptic trammel mechanism and a reducer. A power source through the belt and reducer drives the compound cam and cylindrical cam which further drive the tool changing mechanism. The compound cam may drive the tool changing mechanism whereby the rotation and axial motion of the tool changing arm may sequentially be controlled at the same time for the tool changing apparatus to accomplish the motions such as grasping tool, extracting tool changing tool, inserting tool and releasing tool. The cylindrical cam may drive the elliptic trammel mechanism to sequentially control the drawbar of the spindle so that the drawbar of the spindle may move axially to accomplish the motions such as pushing and pulling the tool.

This invention is mainly characterized in comprising: a tool changing mechanism wherein a spline shaft is securely connected to a tool changing arm which is pivotally connected to the machine body, and the spline shaft is provided with a guiding wheel on its outer circumference and further the spline has securely connected to it a driven roller group and connected opposite thereto is a spline shaft. The invention further includes a compound cam including a roller gear cam and a face car. The circumference of the roller gear cam has a plurality of traits, for example, a plurality of curved open grooves, of open curve in engagement with the driven roller group on the spline to drive the spline and spline shaft to rotate. The face cam is provided with a trait of close curve, for example, a curved closed groove, to drive the driven parts to oscillate reciprocally. The driven parts of the face cam operate similar to a four bar mechanism and include a crank, one end of which is pivoted to the machine body and the other end of which is connected to a connected rod which transmits the displacement of the face cam through the connecting rod to a oscillating arm. The oscillating arm is connected to the guiding wheel thereby causing the spline shaft to be driven to move axially. A cylindrical cam also is provided and is driven by a sproket wheel and a chain. The end face of the cylindral cam is uneven and provided with a trait of closed curve in engagement with a roller of the driven parts and therefore is able to drive the driven parts to more reciprocally due to high and low portions of the uneven end face. Further a particular time sequence relationship is possible between the curve of the cylindrical cam and that of compound cam. The driven parts of the cylindrical cam includes a slider of an elliptic trammel mechanism whereby the slider reciprocates, based on the uneven go force of the cylindrically cam to drive a connecting rod for another slider which pushes the drawbar of the spindle to push and pull a tool. A reducer is provided between the power source and the cam shaft, the reducer being formed by a gear group whereby the input speed of the power source is reduced and the rotating direction thereof is changed to drive the compound cam and cylindrical cam.

By means of the above construction, the compound cam drives the spline and spline shaft to both rotate and move axially whereby the tool changing arm is controlled in accordance the tool changing motion; and the cylindrical cam actuates and drives the elliptic trammel mechanism which in turn drives the drawbar of the spindle to move axially whereby the clamping and releasing of the tools of the spindle is controlled.

The design of this invention alleviates the need to employ the oil compressing unit of the conventional art, and thus the cost is lower. The tool changing motions such as grasping tool, pushing tool, extracting tool, changing tool, inserting tool, pulling tool, and releasing tool are driven by the motor and controlled by means of suitably designed curves of the cams, therefore, the tool changing motion may be very quick and accurate. The motor therefore does not need to stop to detect the motion of pushing tool and pulling tool during pulling tool and then rotate. The movement property of the whole tool changing mechanism therefore is better and the motion thereof is smoother.

The objects and advantages of the present invention will become more apparent from the following detailed description and preferred embodiments when read in connection with the accompanying drawings, in which;

REFERENCE NUMBER OF THE ATTACHED DRAWINGS

Figure 1:
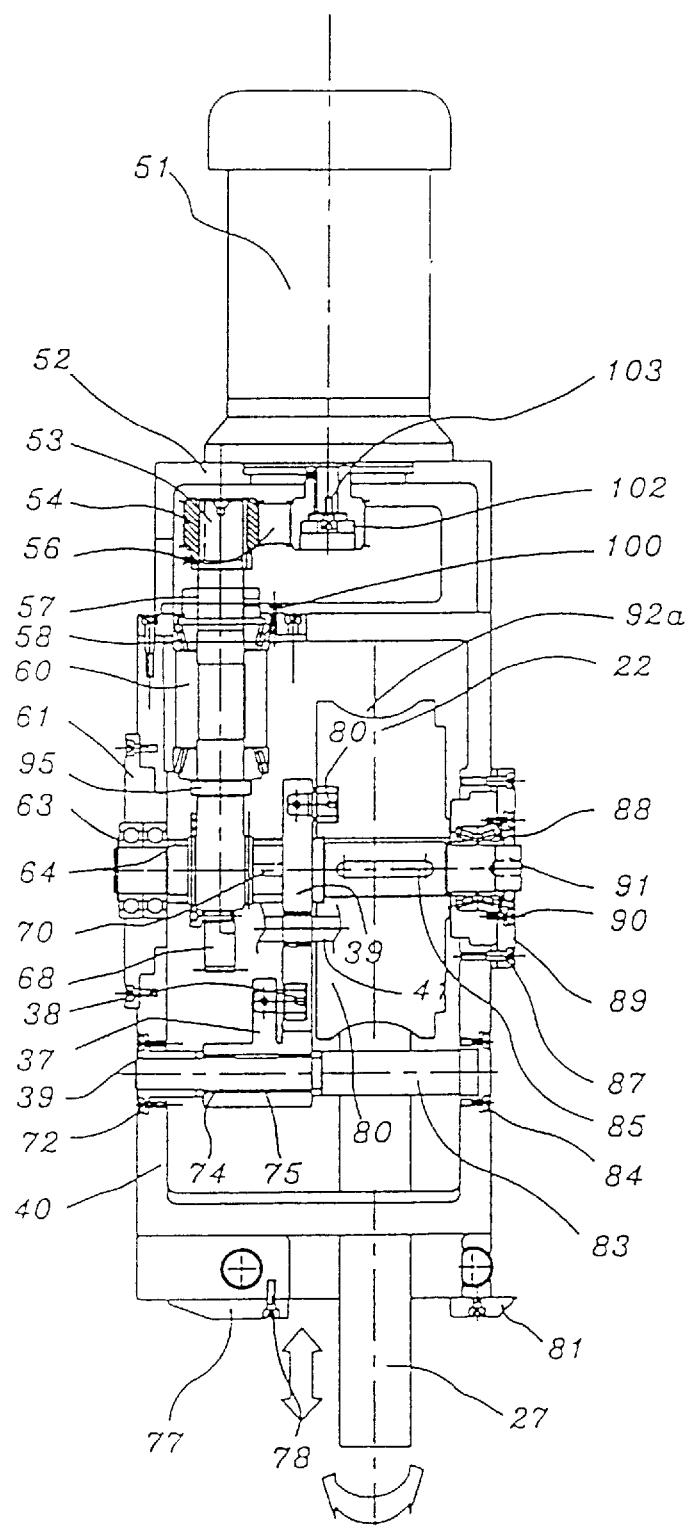
FIG. 1 is a side view of the conventional tool changing mechanism.
Figure 2:
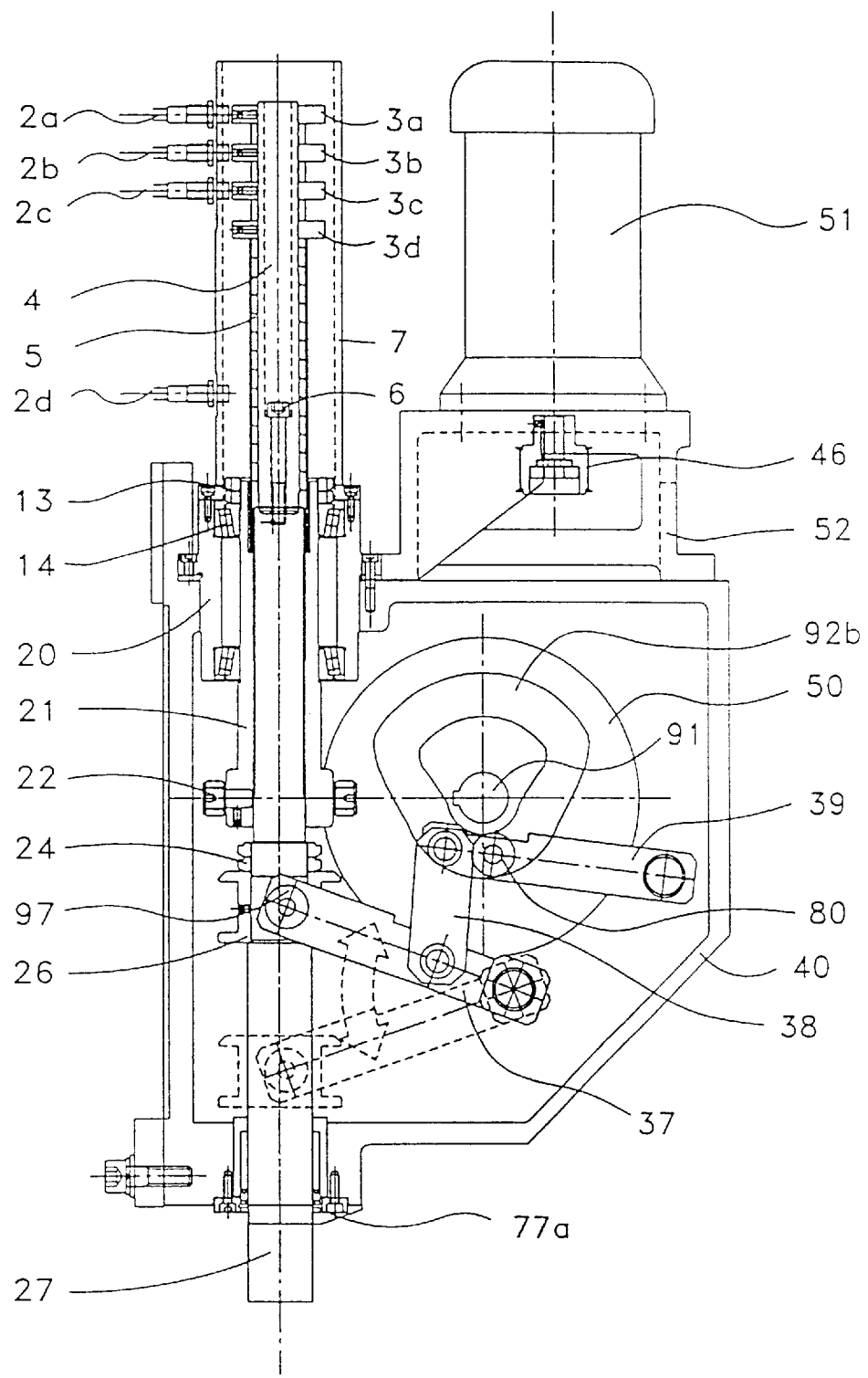
FIG. 2 is a front view of the conventional tool changing mechanism (that is a front view of the face cam and four-bar mechanism)
Figure 3:
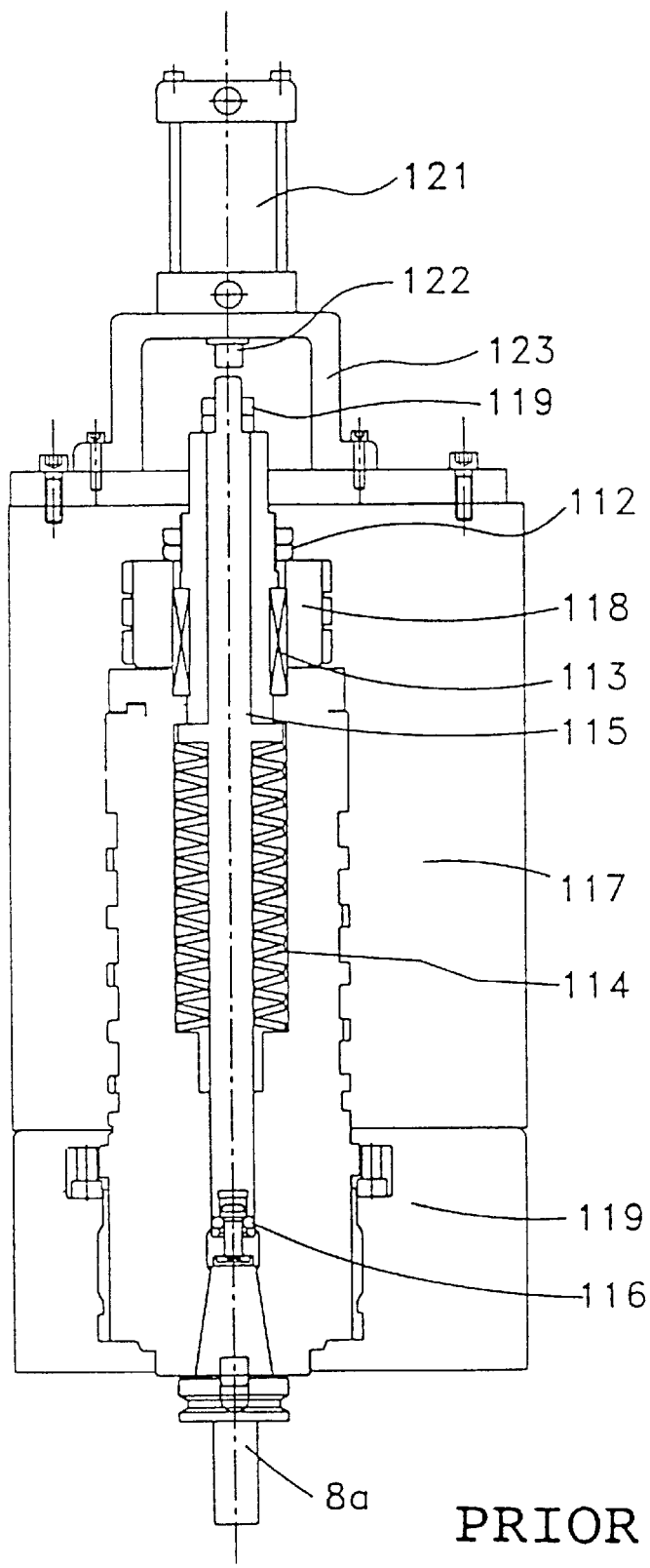
FIG. 3 schematically shows the pushing tool and pulling tool of the conventional spindle.

2a ' 2b ' 2c ' 2d . . . sensing device
3a ' 3b ' 3c ' 3d . . . induction wheel
4 . . . induction shaft of sensing device
5 . . . precompression spring
8a . . . old tool
8b . . . new tool
21 . . . spline
22 . . . roller group
24 . . . fixed
26 . . . guiding wheel
27 . . . spline shaft
37 . . . oscillating arm
38 . . . connecting rod
39 . . . driven parts
40 . . . machine body
46 . . . belt wheel
51 . . . motor
52 . . . bottom seat of the motor
53 . . . worm shaft
54 . . . belt wheel
56 . . . belt
61 . . . left edge cover of the machine body
62 . . . right edge cover of the machine body
64 . . . spacer
68 . . . worm
70 . . . key
71a . . . sprocket wheel
71b . . . sprocket wheel
73 . . . cylindrical cam
74 . . . chain
80 . . . driving roller
83 . . . shaft
85 . . . key
91 . . . driving shaft
92 . . . compound cam
92a . . . roller gear cam
92b . . . face cam
97 . . . roller
101 . . . cylindrical cam
102 . . . roller
103 . . . slider
104 . . . connecting rod
105 . . . slider
106 . . . slider axis
107 . . . spring
108 . . . guideway
114 . . . Belleville spring
115 . . . drawbar of spindle
116 . . . steel ball
119 . . . spindle
121 . . . oil compressing cylinder
122 . . . output shaft of oil compressing cylinder
123 . . . bottom seat of oil compressing cylinder

DETAILED DESCRIPTION OF A PREFERRED EMBODIMENT

Figure 4:
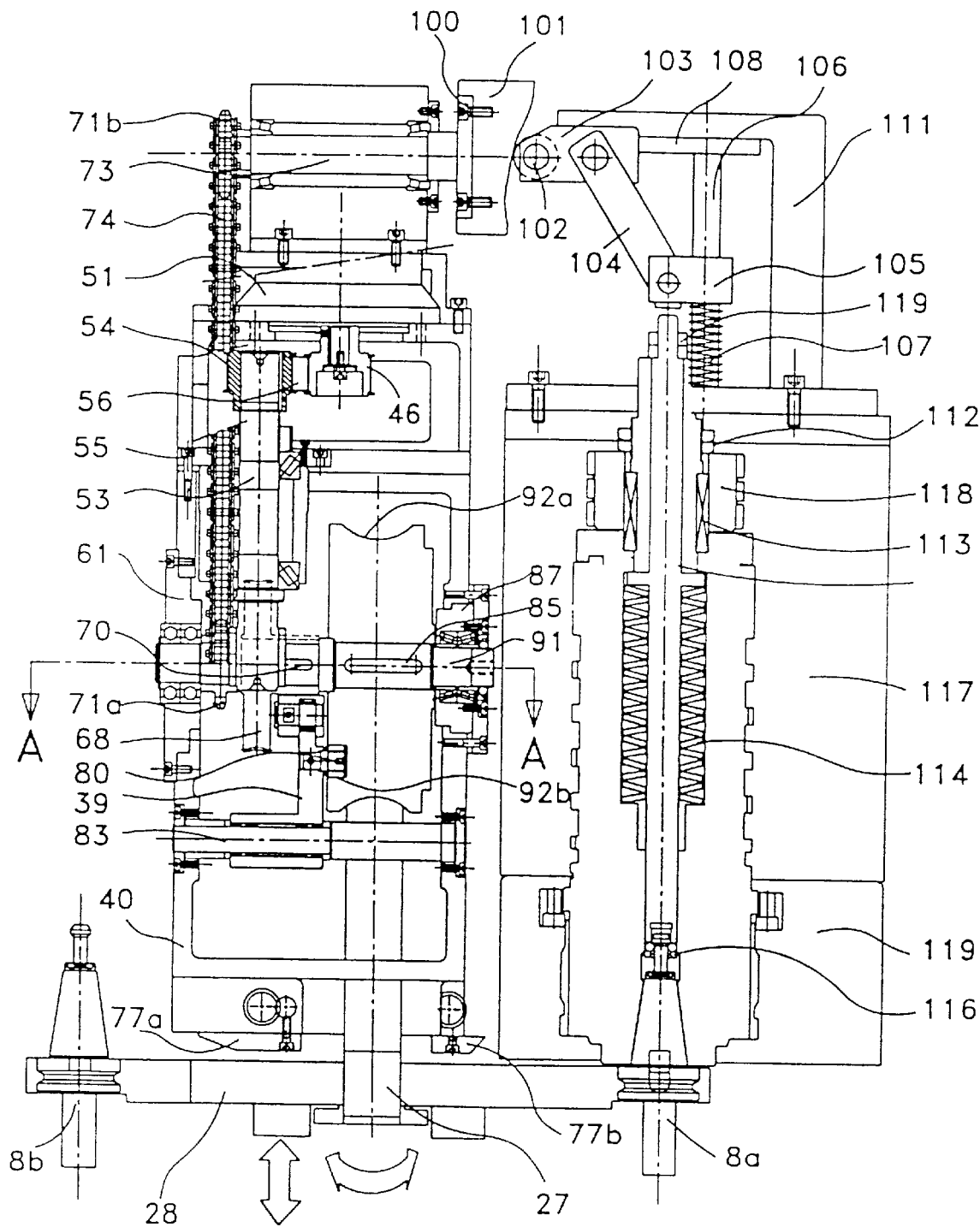
FIG. 4 is a front view of an automatic tool changing mechanism according to this invention.
Figure 5:
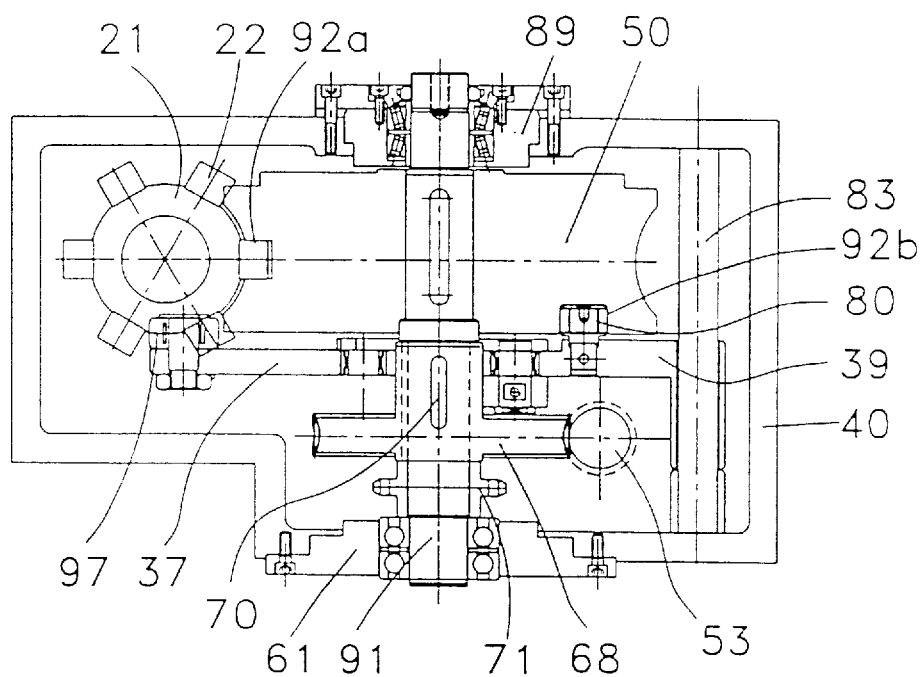
FIG. 5 is a sectional view along section line 5—5 of the front view of an automatic tool changing mechanism according to this invention shown in FIG. 4.
Figure 6:
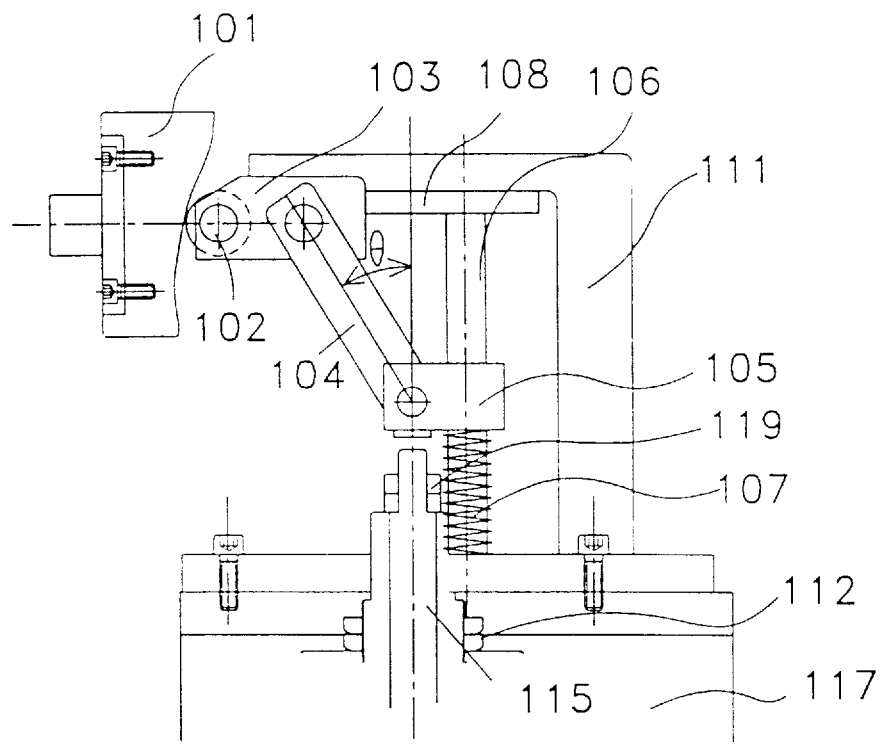
FIG. 6 is a front view of an elliptic trammel mechanism utilized by an automatic tool changing mechanism according to this invention.
Figure 7:
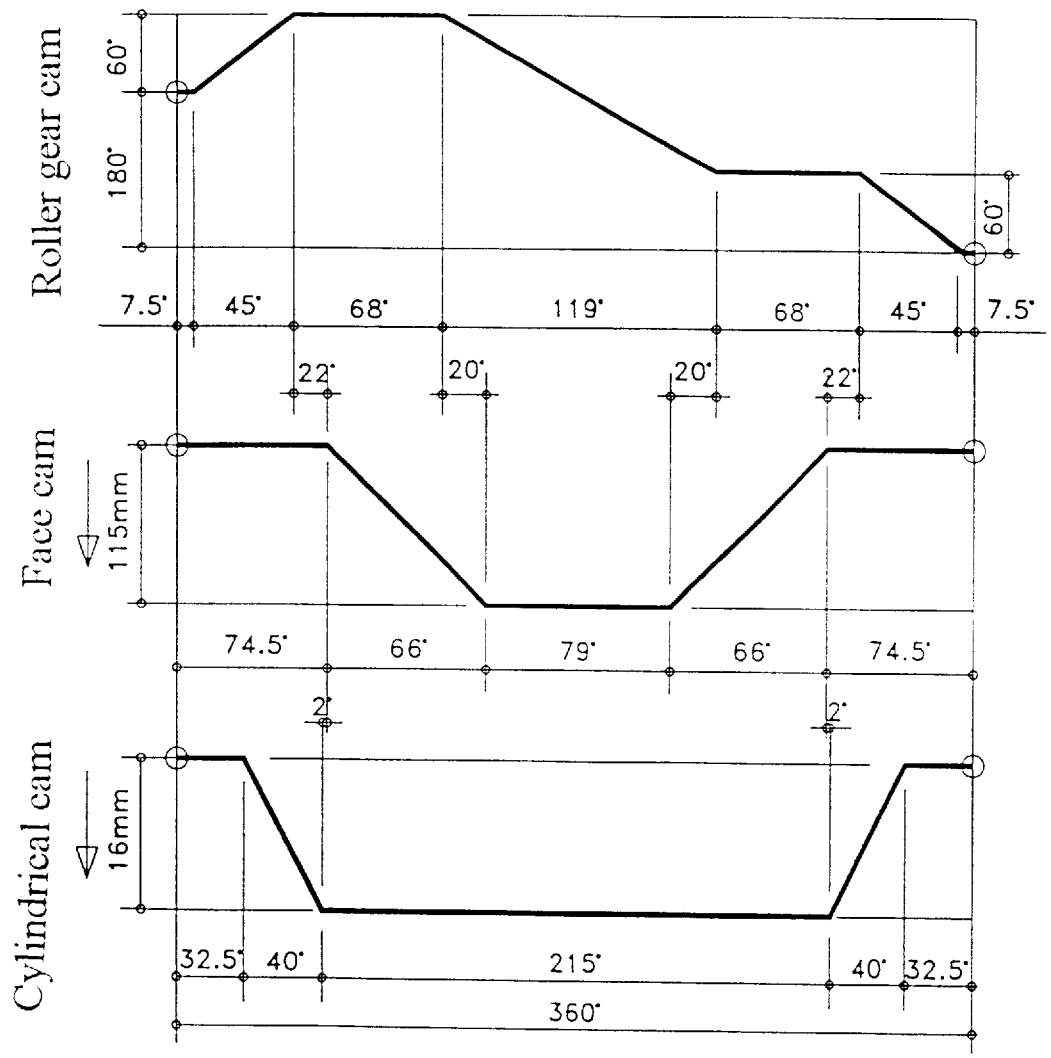
FIG. 7 is the follower displacement chart of the cams of an automatic tool changing mechanism according to this invention.
Figure 8:
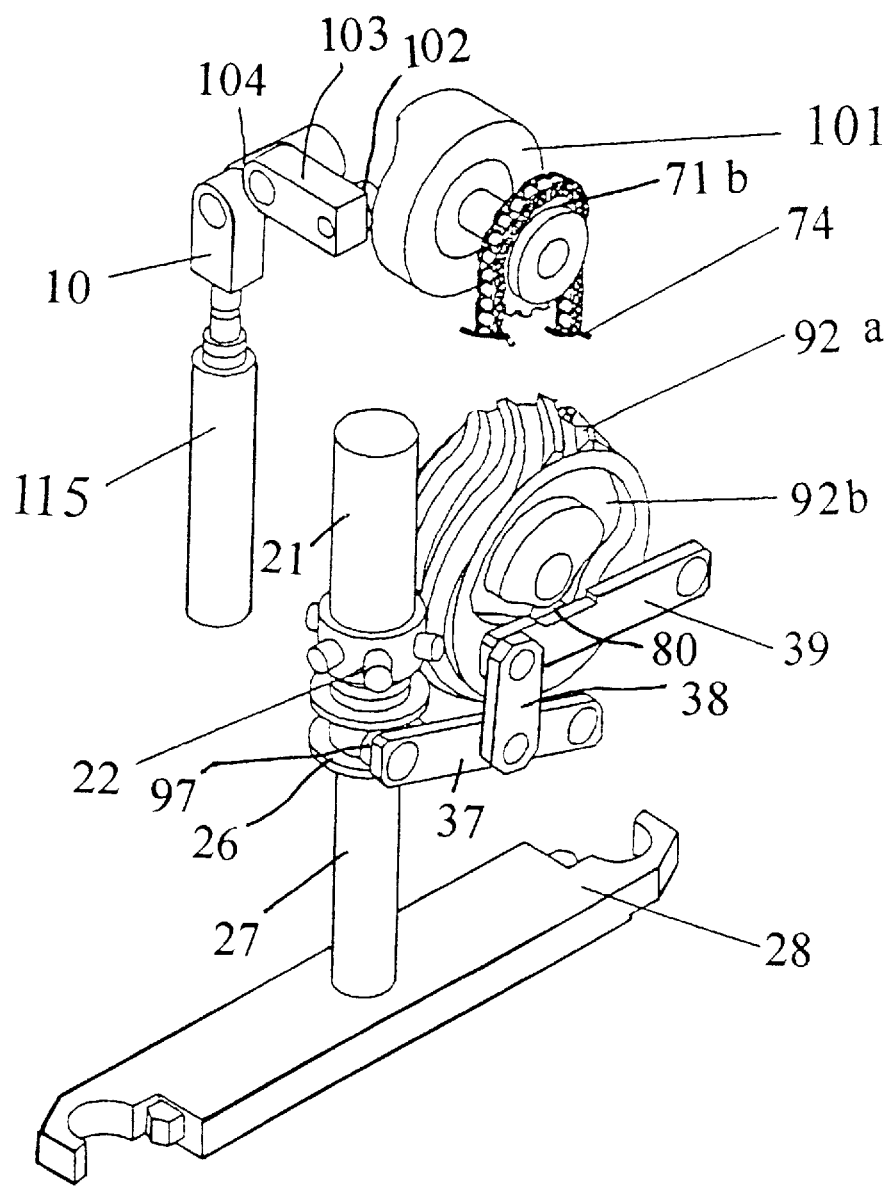
FIG. 8 is a perspective view of the invention.

According to an automatic tool changing apparatus of this invention as shown from FIG. 4 to 8, a motor 51 drives a belt wheel 46. The driving force is transmitted to a worm shaft 53 on a belt wheel 54 through a belt 56 and in turn drives a worm gear 68 to rotate (as is best seen in FIG. 4 and 5). The worm gear 68, compound cam 92 and sprocket wheel 71 are on the same axis. The worm gear 68 is secured on a driving shaft 91 of the compound cam by means of a key 70. The compound cam 92 is formed by a roller gear cam 92a and a face cam 92b and is secured on a driving shaft 91. The circumference of the roller gear cam 92a is provided with a plurality of curved open grooves which engage a roller group 22 on the spline 21 whereby the spline 21 and a spline shaft 27 are driven to rotate. The face cam 92b is provided with a curved closed groove which drives a roller 80 which further drives parts 39 to oscillate reciprocally.

The parts driven by the face cam 92b includes a crank member 39 which rotates around a shaft 83 securedly connected to the machine body 40. The other end of the crank 39 is coupled with one end of a connecting rod 38 while the other end of the connecting rod 38 is connected to an oscillating arm 37 whereby the oscillating motion of the driven parts is enlarged through the connecting rod 38 and transmitted to the oscillating arm 37. One end of the oscillating arm 37 is pivotally connected to the machine body 40, the intermediate portion of the oscillating arm 37 is connected to the connected rod 38, while the other end of the oscillating arm 37 is pivotally connected to a roller 97. The roller 97 is engaged with a guiding wheel 26 provided on the spline shaft 27 so that after the oscillating motion of the driven parts is enlarged, the guiding wheel 26 is driven by the roller to move reciprocally in an axial direction. Both the spline 21 and spline shaft 27 are pivotally connected to the machine body 40 of the tool changing mechanism. After the guiding wheel 26 is driven by the oscillating arm 37, the spline shaft 27 will be driven to move axially relative to the machine body 40 and spline at the same time to generate the motions such as extracting tool and inserting tool during tool changing. And, after the roller group 22 on the spline 21 is driven by the roller gear cam 92a, the spline 21 and spline shaft 27 will be driven to rotate to generate the motions such as grasping tool 8b, changing tool and releasing tool during tool changing.

The sprocket wheel 71a transmits the rotation of the driving shaft 91 of the compound cam 92 to the cylindrical cam shaft 73 through the chain 74 and the sprocket wheel 71b. A cylindrical cam 101 is secured on the cylindrical cam shaft 73. The end face of the cylindrical cam 101 is uneven and is provided with a curved closed groove. The curved closed goove engages a roller 102 on a slider 103 of the elliptic trammel mechanism so that when the roller 102 is driven by the high and low portions of the uneven end face of the cylindrical cam 101, the slider 103 on guideway 108 oscillates reciprocally.

One end of the slider 103 is slidably connected to a guideway 108 and the other end of the slider 103 is securedly connected to the roller 102 while the middle portion of the slider 103 is connected to a connecting rod 104 whereby the oscillating motion of the slider 103 is transmitted to a slider 105. The motion of slider 105 compresses a spring 107 downward and pushes the drawbar of the spindle 115. The drawbar of the spindle 115 in turn compresses a belleville sping 114 to allow steel balls 116 on the bottom end of the drawbar of spindle 115 in a spindle head 119 to move outwardly and then release to accomplish the motion of pushing tool for an old tool to be pulled out. When a new tool 8b is inserted inside the spindle head 119, the recovering force of the belleville spring 114 and the spring 107 will combine to pull the drawbar 115 to clamp the new tool to accomplish the motion of pulling tool. Also, this force will push the slider 105 to allow the roller 102 on the slide 103 to engage with the cylindrical cam 101.

In application, the elliptic trammel mechanism will enlarge the input force. Assuming the force to push the roller of the crank as F, both the length of the crank and that of the connecting rod as L, and the angle between connecting rod and the perpendicular line as θ, a force P will be generated from the slider as $$P = \frac{F}{\tan \theta}$$

According to the main feature of this invention, if θ is very small, P will be far greater than F to satisfy the required great force for pushing the pulling bar of spindle to compress the belleville spring.

In comparison with the conventional machine this invention is smoother in motion, quicker in changing tool and lower in cost. It greatly improves the defects of long tool change time and high cost for changing tool caused by the otherwise necessary sensing device and the oil compressing unit as found in conventional art.

The above embodiment is described with a view alone that the roller on the slider is perpendicular to the ground. However, it is understood that in practical use, the roller may be horizontally secured on the slider. It means that the varied design of the rotating axis of the roller may also satisfy the requirements of the original design, and should fall within the scope of the claims of this invention.

What claims is:

1. An assembly for an automatic tool changer, comprising:

a spline;

a spline shaft engaged with said spline;

a roller group engaged with said spline;

a guiding wheel engaged with said spline shaft;

a first cam shaft;

a compound cam engaged with said first cam shaft, said compound cam including a roller gear cam and a face cam, said roller gear cam engaging said roller group such that said roller group is driven to rotate when said compound cam is rotated about said first cam shaft;

oscillating means for oscillating said guiding wheel, said oscillating means being engaged with said face cam and said guiding wheel such that said guiding wheel is driven to oscillate when said compound cam is rotated about said first cam shaft;

a second cam shaft, said second cam shaft being operatively coupled with said first cam shaft;

a cylindrical cam engaged with said second cam shaft, said cylindrical cam being defined by a cylindrical periphery and at least one uneven end face;

operating means for operating a drawbar of a spindle to release or engage a tool, said operating means being driven by said uneven end face of said cylindrical cam.

2. The assembly defined in claim 1, wherein:

said operating means includes a driven member, a driving member, and a coupling member having a first end coupled to said driven member and a second end coupled to said driving member, wherein said driven member is engaged with said uneven end face of said cylindrical cam and said driving member is for engaging said drawbar of said spindle.

3. The assembly defined in claim 2, wherein:

said driven member is slidably constrained to move along a driven axis and said driving member is slidably constrained to move along a driving axis.

4. The assembly defined in claim 3, wherein:

said operating means is arranged such that when said cylindrical cam is rotated about said second cam shaft, said driven member is moved along said driven axis by a high portion of said uneven end face and said coupling member is thereby driven to move said driving member along said driving axis.

5. The assembly defined in claim 4, further comprising:

a driven member sliding constraint; and a driving member sliding constraint, wherein, said driven member is slidably engaged with said driven member sliding constraint and said driving member is slidably engaged with said driving member sliding constraint.

6. The assembly defined in claim 5, wherein:

said driven member includes a roller mechanism, said roller mechanism being engaged with said uneven end face of said cylindrical cam.

7. The assembly defined in claim 6, wherein:

said first cam shaft and said second cam shaft each include a pulley and are operatively connected by a chain engaged with said pulleys.

8. The assembly defined in claim 7, further comprising:

a motor, said motor being operatively connected with said first cam shaft, wherein operation of said motor rotates said first cam shaft and rotation of said first cam shaft rotates said second cam shaft via said chain mechanism.

* * * * *